United States Patent

[11] 3,614,261

[72] Inventor  Karl E. Friese
               Dover, N.H.
[21] Appl. No. 7,296
[22] Filed     Jan. 9, 1970
[45] Patented  Oct. 19, 1971
[73] Assignee  IMC Magnetics Corporation

[54] BEARING SEAL MEANS FOR AN ELECTRICALLY DRIVEN FAN
     7 Claims, 4 Drawing Figs.
[52] U.S. Cl. .................................................. 416/174,
                            416/244, 308/364, 416/170
[51] Int. Cl. .................................................. F04d 29/04,
                                                             F16c 1/29
[50] Field of Search .......................................... 416/3, 170,
                 134, 174; 417/353; 310/90; 308/36.1, 36.4

[56]            References Cited
            UNITED STATES PATENTS
3,167,672  1/1965  Tupper .................... 310/90
3,378,192  4/1968  Friese ..................... 417/353

Primary Examiner—Martin P. Schwadron
Assistant Examiner—Clemens Schimikowski
Attorney—Breitenfeld & Levine ABSTRACT: A tubular ferrule connects the fan impeller to the rotor of the fan motor. Fixed within the ferrule is a porous bearing rotatable about a shaft fixed to the fan frame. One end of the ferrule carries a cuplike member, within which may be a felt ring, for accumulating any lubricating oil seeping out from between the bearing and shaft.

PATENTED OCT 19 1971 3,614,261

INVENTOR:
KARL E. FRIESE
BY
Breitenfeld & Levine
ATTORNEYS

BEARING SEAL MEANS FOR AN ELECTRICALLY DRIVEN FAN

This invention relates to electrically driven fans of the type shown in U.S. Pat. No. 3,378,192, wherein the annular rotor of the fan motor is rotatably mounted with respect to a stationary shaft, projecting from the fan framework, by means of a ferrule and a bearing concentrically arranged within the rotor, the fan impeller being secured to the ferrule.

More particularly, the invention relates to the sealing means at one end of the bearing.

In these fans, the ferrule has an enlarged head at one end accommodating a source of lubricating oil, and oil is drawn from this source between the relatively moving opposed surfaces of the bearing and shaft. Some of the oil flows toward the opposite end of the bearing, and tends to seep out from between that end and the shaft.

It is an object of the present invention to provide a sealing means of simple construction for accumulating any oil which seeps past one end of the bearing.

It is another object to provide such a sealing means which has no rubbing contact with any surface and hence is not subject to wear.

It is a further object to provide a sealing means capable of feeding accumulated oil back to the bearing when needed.

To achieve these objectives, the end of the ferrule opposite the enlarged head carries an annular cuplike means surrounding the shaft. The inner edge of the cuplike means is slightly spaced from both the shaft and the end of the bearing, the relative spacing being such that when an oil droplet moves past the bearing, it engages the rotating inner edge of the cup and is thrown into the cup. A felt ring within the cup absorbs the oil, and when the bearing becomes dry the oil in the ring is fed back to the bearing.

Additional features and advantages of the invention will be brought out in the following description in which reference is made to the accompanying drawings.

Figure 1:
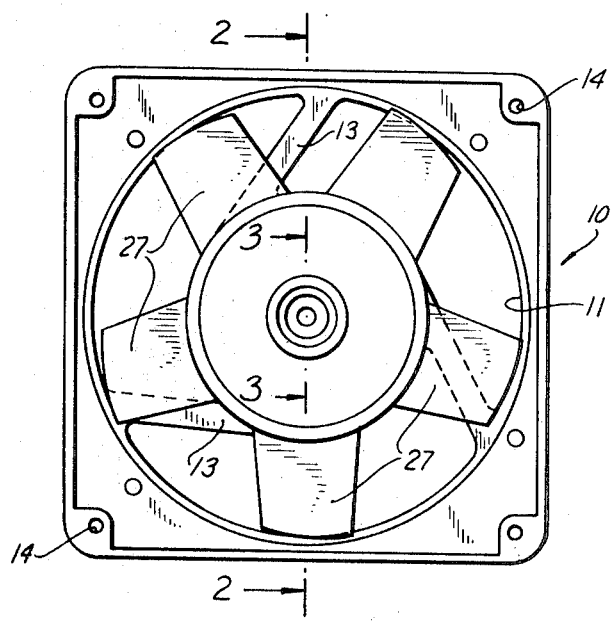
FIG. 1 is a front elevational view of a fan of the type to which this invention relates.

The fan chosen to illustrate this invention includes a frame 10 comprising a square outer portion provided with a central circular opening 11, and a motor support 12 held at the center of the opening 11 by a number of struts 13 extending between the support 12 and the outer portion of the frame. If desired, the entire frame can be formed as a single casting. At its corners, the frame 10 is provided with holes 14 for accommodating suitable fasteners (not shown). By means of these fasteners, the frame can be mounted in or near a region in which air is to be circulated.

The motor support 12 is a circular, cuplike element having a central bore 15. One end of a stationary generally cylindrical shaft 18 is fixed in the bore 15, by any suitable means such as a cement, and the balance of the shaft 18 projects from the support 12 in cantilever fashion. The shaft, in effect, serves as an extension of the frame 10 upon which the impeller of the fan is rotatably supported.

The impeller is rotated by an induction motor comprising a stator 20 and a rotor 21. The stator 20 is a generally annular-shaped body having a central bore 22, and is fixed within the motor support 12 by suitable fastening means (not shown). The stator is provided with the usual field windings 25 which may be energized from any suitable source of electrical current. The rotor 21 is an annular body located within the bore 22 of the stator, but unconnected to the stator.

Figure 2:
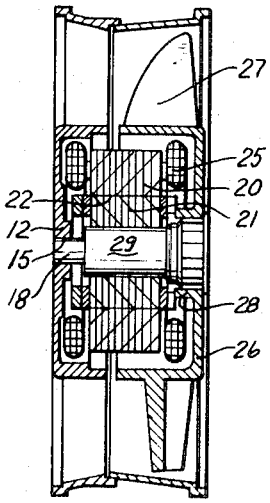
FIG. 2 is a vertical cross-sectional view taken on line 2—2 of FIG. 1.

The impeller of the fan may comprise a generally cupshaped hub 26 formed with radially projecting blades 27. At the center of its front wall, the hub presents an inwardly projecting collar 28. Preferably, the hub 26, blades 27, and collar 28 are integrally formed of, for example, a suitable molded plastic. When the impeller is in place, as shown in FIG. 2, the sidewalls of the hub 26 terminate close to the sidewalls of the motor support 12, whereby the hub and motor support form a housing for the induction motor.

The impeller is secured to the rotor 21 by means of a generally tubular ferrule 29, the body portion of the ferrule being fixed, such as by a suitable cement, to the inner surface of the rotor. The ferrule extends beyond the rotor, and terminates in a head 30 of enlarged diameter. A flange 31 extends radially outwardly from the free end of the head 30. The outer diameter of the head 30 is about equal to the inner diameter of the collar 28, and the head 30 is formed with axially extending ridges 34 which project radially from its outer surface. Thus, when the ferrule head 30 is forced into the collar 28, the ridges 34 grip the inner surface of the collar and secure the ferrule to the impeller. Thereafter, the body of the ferrule is secured to the rotor 21. The flange 31 defines the assembled relationship of the ferrule and impeller, by seating against the outer face of the hub 26.

Fixed to the inner surface of the body of the ferrule 29 is a cylindrical bearing 35 which is rotatable over the surface of the shaft 18. By means of this bearing, the ferrule, and hence the rotor 21 and the impeller are rotatably supported on the shaft 18.

Figure 3:
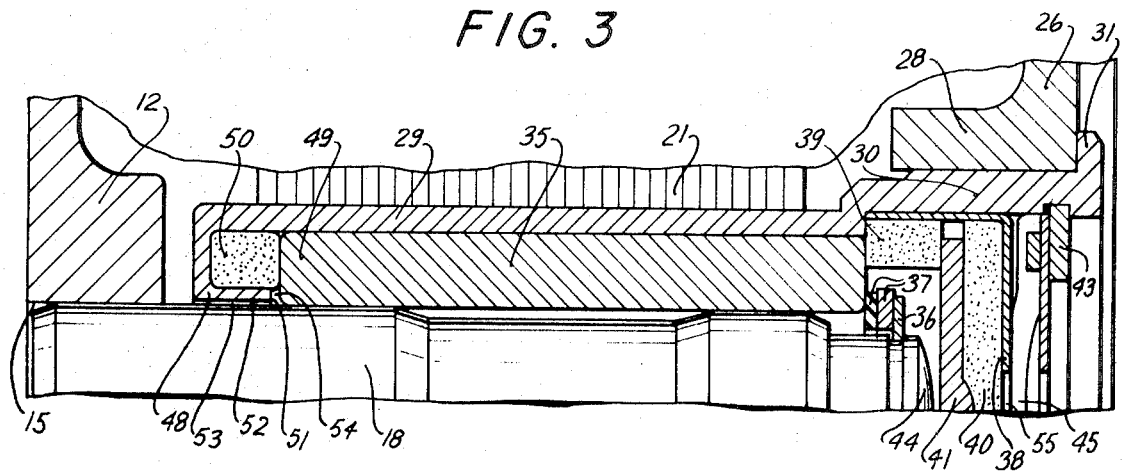
FIG. 3 is a fragmentary vertical cross-sectional view, on an enlarged scale, taken on line 3—3 of FIG. 1.
Figure 4:
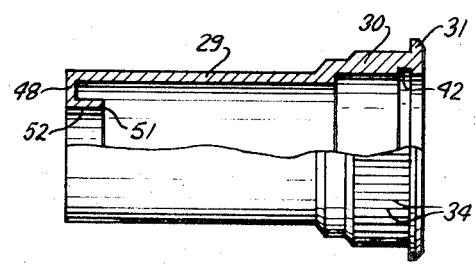
FIG. 4 is an elevational view partially in section, of a ferrule according to this invention.

In assembling the fan, the stator is first fixed to the framework. The bearing, ferrule, rotor, impeller assembly is then slipped over the shaft 18, and a snap ring 36 and spacer washers 37 are then pushed over the end 44 of the shaft 14, the ring 36 snapping into an annular groove near the shaft end. The washers 37 abut against the right end face (in FIG. 3) of the bearing 35 and thereby prevent the ferrule 29 and the parts fixed to it from moving toward the right and slipping off the shaft 18. Snugly fitted within the ferrule head 30 is a cap 38 enclosing a fibrous ring 39, a fibrous disk 40, and a nylon disk 41. Adjacent to the outer face of the cap 38, the inner surface of the wall of the ferrule head is formed with an annular groove 42 accommodating a snap ring 43. A washer 45 is located between the snap ring 43 and the cup 38. As a consequence of this construction, when the fan is in operation and blowing air toward the right in FIGS. 2 and 3, the reaction force on the impeller urges the latter toward the left. This force is transmitted through the ferrule, snap ring 43 and washer 45, to the cap 38, which in turn forces the nylon disk 41 against the rounded end 44 of the shaft. Movement of the rotating parts toward the left is thereby limited.

The bearing is formed of a very porous material, such as produced by sintering a mixture of graphite and bronze powder. Before assembly with the other parts, the bearing is saturated throughout with a lubricant such as oil. The fibrous ring 39 and disk 40, which may be formed of felt, are also saturated with oil and serve as a reservoir of lubricant for the bearing.

At its end opposite head 30, the ferrule 29 is reversely turned inwardly to define an annular cuplike means 48 surrounding shaft 18. Although cup 48 is shown integral with the remainder of ferrule 29, it could be a separate piece secured to the ferrule, as by cement. The cup 48 extends beyond the end 49 of bearing 35, and serves as a seal for trapping any oil which flows out from between the end 49 of the bearing and the shaft 18. Preferably a fibrous ring 50, which may be felt, is located within cup 48 for absorbing oil entering the cup.

The radially inner wall 52 of annular cup 48 is spaced slightly from shaft 18, and the inner free edge 51 at the inner end of wall 52 is spaced from the end 49 of bearing 35. The space 53 between wall 52 and shaft 18 is of a capillary nature, e.g., of the order of 0.005 inch, so that oil will not readily flow through the space. The space 54 between edge 51 and the end face of bearing 35 may be about the same size as that of space 53, but preferably is slightly larger. In any case, space 54 should not be larger than about 0.010 inch.

Should a drop of oil seep out from between the end 49 of bearing 35 and the shaft 18, it will contact inner edge 51 of cup 48. Since this edge is rotating rapidly, the oil drop is thrown radially outwardly by centrifugal force into cup 48, wherein it is absorbed by ring 50. Thus, the oil gets no opportunity to flow past edge 51, toward the left in FIG. 3, between wall 52 and shaft 18.

As absorbent ring 50 accumulates oil, it becomes a reservoir of oil. In time, the oil within bearing 35 tends to evaporate and break down, until eventually bearing 35 requires oil. Since the bearing is in contact with the ring 50, the porous bearing will suck oil out of the ring.

The major lubrication for the bearing is of course made available by the oil within ring 39 and disk 40. In order to add oil to the assembly, an oil-filled hypodermic syringe may be used. The syringe is pushed through a hole 55 in cup 38 and into disk 40.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. An electrically driven fan comprising:
a frame
an induction motor having a stator fixed to said frame and an annular-shaped rotor rotatable with respect to said stator and frame,
a stationary shaft fixed at one end to said frame and projecting in cantilever fashion therefrom,
a hollow, generally cylindrical ferrule fixed within said rotor and rotatable therewith,
a cylindrical bearing fixed within said ferrule and rotatable with respect to said shaft, said rotor, ferrule, and bearing being rotated together when said motor is energized,
a fan impeller fixed to said ferrule, and
annular cuplike means carried by one end of said ferrule and rotatable therewith, said cuplike means extending beyond one end of said bearing and surrounding said shaft, the inner edge of said cuplike means closest to said bearing being spaced slightly from both said shaft and said bearing, said one end of said bearing communicating with the interior of said cuplike means through said spacing between said cup edge and said bearing end, whereby if a drop of oil lubricating the relatively moving shaft and bearing surfaces seeps past said one end of said bearing it will contact said inner edge of said cuplike means and be thrown radially outwardly by centrifugal force through said spacing between said cup edge and said bearing end and into said cuplike means.

2. A fan as defined in claim 1 wherein the spacing between said inner edge and said bearing is larger than the spacing between said inner edge and said shaft.

3. A fan as defined in claim 2 wherein the spacing between said inner edge and said shaft is of the order of 0.005 inch.

4. A fan as defined in claim 2 wherein the spacing between said inner edge and said one end of said bearing is no more than about 0.010 inch.

5. A fan as defined in claim 1 wherein said cuplike means is integral with said ferrule.

6. A fan as defined in claim 1 including a ring of absorptive material within said cuplike means.

7. A fan as defined in claim 6 wherein said absorptive material is felt.